United States Patent [19]

Hildebrand et al.

[11] Patent Number: 4,669,370

[45] Date of Patent: Jun. 2, 1987

[54] AIR FLOW GUIDE ASSEMBLY IN AUTOMOTIVE VENTILATING SYSTEM

[75] Inventors: Reinhard Hildebrand, Redwitz; Djuanarto-Adi Kusuma, Dörfles-Esbach, both of Fed. Rep. of Germany

[73] Assignee: Siemens Aktiengesellschaft, Berlin and Munich, Fed. Rep. of Germany

[21] Appl. No.: 835,454

[22] Filed: Mar. 3, 1986

[30] Foreign Application Priority Data

Mar. 21, 1985 [DE] Fed. Rep. of Germany ....... 3510279

[51] Int. Cl.$^4$ ............................................. F24F 13/10
[52] U.S. Cl. ........................................ 98/2; 98/40.24; 98/40.28
[58] Field of Search ................... 98/2, 40.24, 40.27, 98/40.28

[56] References Cited

U.S. PATENT DOCUMENTS

| 622,375 | 4/1899 | Leather | 98/40.28 |
| 2,759,411 | 8/1956 | Jenson | 98/40.28 |
| 3,035,504 | 5/1962 | Cline et al. | 98/40.27 |
| 3,264,971 | 8/1966 | Dangauthier | 98/2 |
| 3,942,419 | 3/1976 | Beach | 98/40.24 X |

FOREIGN PATENT DOCUMENTS

| 1430300 | 3/1969 | Fed. Rep. of Germany | 98/2 |
| 1432145 | 4/1976 | United Kingdom | 98/40.28 |

Primary Examiner—Harold Joyce
Attorney, Agent, or Firm—Kenyon & Kenyon

[57] ABSTRACT

An air flow guide assembly for use in the ventilating system of an automotive vehicle comprises an air guide element with a multiplicity of parallel spaced fins. The air guide element is attached to a crossbar in turn rotatably connected to a housing for pivoting about an axis extending perpendicularly to a direction of inflowing air. The housing is insertable in a sleeve-shaped receptacle or formation on a dashboard panel.

10 Claims, 5 Drawing Figures

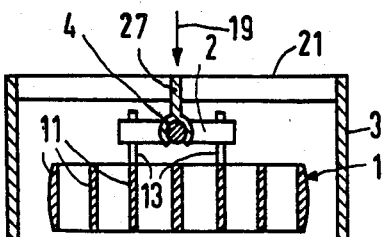
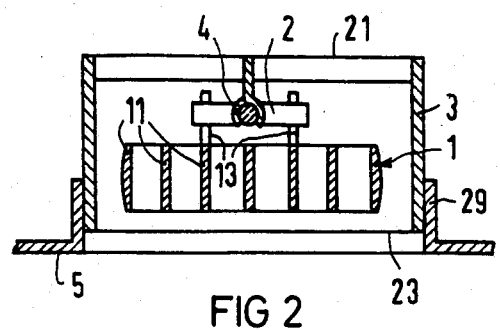
FIG 1
FIG 2
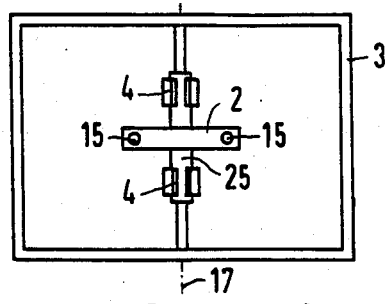
FIG 3
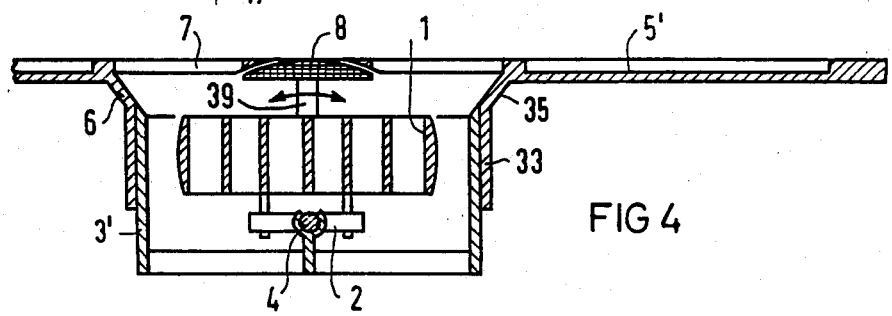
FIG 4
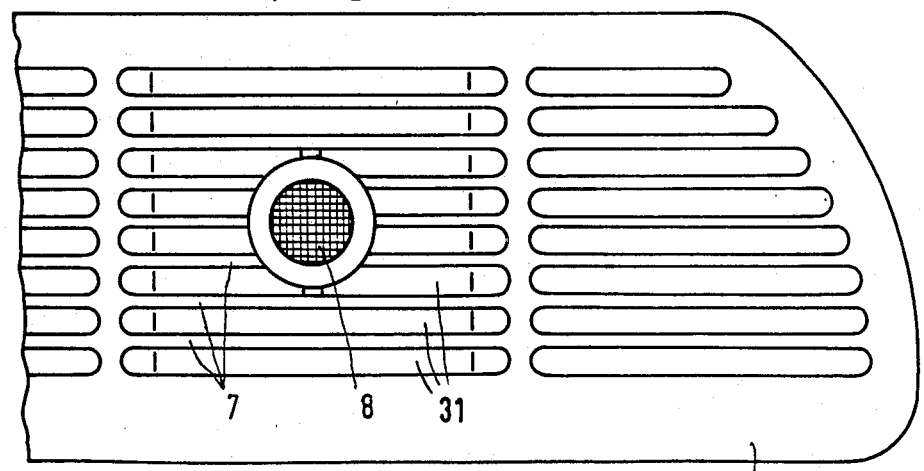
FIG 5

AIR FLOW GUIDE ASSEMBLY IN AUTOMOTIVE VENTILATING SYSTEM

BACKGROUND OF THE INVENTION

This invention relates to a ventilating system of an automotive vehicle and, particularly, to an assembly therein for controlling the direction of air flow into a passenger compartment of the vehicle.

Air flow guide assemblies of this type are found predominantly at the dashboards of motor vehicles and generally include respective housings and ventilating grills made of synthetic resin material. The ventilating grill comprises several slats snapped into a frame. In order to enable a change in the direction of air flow, the individual slats are connected to each other by a linking rod.

For ventilating or air guide assemblies of this type, installation costs are high and the number of tools required for installation are numerous. Moreover, when the grill is turned, it frequently projects beyond the housing into the passenger compartment of the vehicle.

An object of the present invention is to provide an improved air flow guide assembly of the above-described type.

Another object of the present invention is to provide such an air flow guide assembly in which the number of parts is reduced without adversely affecting the operation of the ventilating system.

Yet another object of the present invention is to provide such an air flow guide assembly in which manufacturing and installation costs are decreased.

An additional object of the present invention is to provide such an air flow guide assembly which provides enhanced safety for passengers in the automotive vehicle.

Another, more particular, object of the present invention is to provide such an air flow guide assembly in which air deflection components never project into the passenger compartment of the vehicle.

SUMMARY OF THE INVENTION

The present invention is directed to an assembly installable in the ventilating system of an automotive vehicle for adjustably controlling air flow into the passenger compartment of the vehicle. In accordance with the invention, the assembly comprises a housing, a crossbar and an integral air guide element. The housing has an air inlet end and an air outlet end and defines a direction of inflowing air extending from the inlet end towards the outlet end. The crossbar is pivotably connected to the housing for rotation about an axis extending substantially perpendicularly to the direction of inflowing air. The air guide element is attached to the crossbar in the housing for rotation with the crossbar about the axis. The guide element includes a multiplicity of air deflection components such as guide fins rigidly connected to one another. In accordance with another feature of the invention, the air guide element is connected to the crossbar in a snap lock. Moreover, an actuator may be provided for facilitating the rotation of the guide element and the crossbar about the axis to change a direction of outflowing air at the outlet end of the housing in response to manipulations of the actuator by an operator.

In accordance with another feature of the present invention, the housing is mounted to a dashboard panel having a multiplicity of stationary ribs spaced from one another to form a grid. The ribs of the panel are preferably disposed substantially in a common plane, while the air guide element is spaced from that plane.

In accordance with another feature of the present invention, the dashboard panel is provided with a mounting element for receiving a housing, the mounting element having a diverging mouth at an outlet end.

All of the elements of the air flow guide assembly in accordance with the invention are advantageously made of a synthetic resin material.

An air flow guide assembly in accordance with the present invention has a small number of parts and is easily assembled. The conventional slats and corresponding linking rod are eliminated. Moreover, owing to the crosswise support, the air guide element can be adjusted in two directions and thereby influenced by the direction of air flow.

The diverging mouth of the mounting element of the dashboard panel serves to increase the cross-section of the outflowing air of the air guide assembly and to increase the maximum possible angle at which air flows from the air guide assembly.

BRIEF DESCRIPTION OF THE INVENTION

FIG. 1 is a cross-sectional view of an air flow guide assembly in accordance with the present invention.

FIG. 2 is a cross-sectional view similar to FIG. 1, additionally showing a dashboard panel as part of the assembly.

FIG. 3 is a front elevational view, taken from the bottom of FIG. 1, with a ventilating grill or air guide element removed.

FIG. 4 is a cross-sectional view of an air flow guide assembly in accordance with the present invention, showing additional features not illustrated in FIGS. 1 and 2.

FIG. 5 is a front elevational view of the assembly illustrated in FIG. 4 taken from the top of that Figure.

DETAILED DESCRIPTION

As illustrated in FIG. 1, an air flow guide assembly for installation or inclusion in the ventilating system of an automotive vehicle comprises an integral ventilating grill or air guide element 1 which includes a multiplicity of air deflection fins 11. Fins 11 are parallel to and spaced from one another. Air guide element 1 is provided on one side with a pair of mounting arms 13 which are inserted through respective holes 15 at opposite ends of an elongate crossbar 2. Arms 13 are connected to crossbar 2 in a snap-lock fit.

Crossbar 2 is pivotally connected to a housing 3 for rotation about an axis 17. Axis 17 is oriented perpendicularly to the direction of inflowing air, indicated by an arrow 19. Inflowing air direction 19 is defined by housing 3 and extends from an air inlet end 21 of housing 3 towards an air outlet end 23 thereof.

Crossbar 2 is advantageously rigid with a cylindrical shaft or bar 25 in turn rotatably journaled in a pair of C-shaped resilient jaws 4. Jaws 4 are located at the free ends of respective brackets 27 in turn rigid with housing 3.

As illustrated in FIG. 2, housing 3 is advantageously insertable into a receptacle defined by a sleeve-shaped formation 29 on a dashboard panel 5.

As shown in FIGS. 4 and 5, a dashboard panel 5' may be provided with a grid formed by a multiplicity of stationary ribs 7 spaced from one another by air gaps 31.

An air flow guide assembly in accordance with the invention may include a housing 3' advantageously mountable to dashboard panel 5' by means of a sleeve-shaped formation 33 on the dashboard panel. Formation 33 includes a mouth portion 35 at an outlet end of sleeve-shaped formation 33, which mouth portion diverges in a direction extending from an inlet end to the outlet end of the sleeve-shaped formation.

As shown in FIG. 4, air guide element 1 may be provided on a side opposite crossbar 2 with an actuator member 39 for facilitating the pivoting of air guide element 1 and crossbar 2 about axis 17 by an operator. Actuator member 39 has a maniputable knob 8 at an end of the lever opposite air guide element 1, knob 8 being disposed in a plane defined by ribs 7 of dashboard panel 5'. It is to be noted that air guide element 1 is spaced from the plane defined by ribs 7, whereby a rotation of guide element 1 does not result in a projection of individual fins thereof beyond dashboard 5 or 5'.

Air guide element 1, crossbar 2, housing 3 and actuator 8 may all be made from a synthetic resin or thermoplastic material such as acrylnitril-butadiene-styrene-polycarbonate blend or polyphenylene oxide (PPO).

Although the invention has been described in terms of particular embodiments and modifications, one of ordinary skill in the art, in light of this teaching, can generate additional embodiments and modifications without departing from the spirit of or exceeding the scope of the claimed invention. Accordingly, it is to be understood that the drawings and illustrations herein are proffered by way of example to facilitate comprehension of the invention and should not be construed to limit the scope thereof.

What is claimed is:

1. In a ventilating system of an automotive vehicle, an assembly for adjustably controlling the direction of air flow into a passenger compartment of said vehicle, said assembly comprising:
   a housing having an air inlet end and an air outlet end, said housing defining a direction of inflowing air extending from said inlet end towards said outlet end;
   an elongate crossbar pivotably connected to said housing for rotation about an axis extending substantially perpendicularly to said direction of inflowing air; and
   an integral air guide element including a multiplicity of air deflection components rigidly connected to one another, said air guide being connected to said crossbar in a snap lock, said air guide element and said crossbar being disposed in said housing.

2. The assembly defined in claim 1 further comprising a dashboard panel having a multiplicity of stationary ribs spaced from one another to form a grid, said housing being mounted to said dashboard panel.

3. The assembly defined in claim 2 wherein said dashboard panel is provided with mounting means for receiving said housing, said mounting means having an additional inlet end and an additional outlet end, said mounting means having at said additional outlet end a mouth portion diverging in a direction extending from said additional inlet end towards said additional outlet end.

4. The assembly defined in claim 1 wherein said crossbar is mounted to said housing proximately to said inlet end.

5. The assembly defined in claim 4, further comprising an actuator lever connected to said air guide element on a side thereof opposite said crossbar.

6. The assembly defined in claim 5 wherein said air guide element is provided with a pair of arms on a side of said air guide element opposite said actuator lever, said arms being inserted in respective holes in said crossbar.

7. In a ventilating system of an automotive vehicle, an assembly for adjustably controlling the direction of air flow into a passenger compartment of said vehicle, said assembly comprising:
   a housing having an air inlet end and an air outlet end, said housing defining a direction of inflowing air extending from said inlet end towards said outlet end;
   an elongate crossbar pivotably connected to said housing, at a point spaced from said outlet end, for rotation about an axis oriented substantially perpendicularly to said direction of inflowing air;
   an integral air flow guide element attached to said crossbar in said housing for rotation with said crossbar about said axis, said guide element including a multiplicity of air deflection components rigidly connected to one another; and
   actuator means manipulatable by an operator for facilitating the rotation of said guide element and said crossbar about said axis to change a direction of outflowing air at said outlet end of said housing.

8. The assembly defined in claim 7 wherein said actuator means is located on one side of said guide element and said crossbar is attached to said guide element on another side thereof opposite said actuator means.

9. The assembly defined in claim 7 wherein said guide element is attached to said crossbar in a snap lock.

10. The assembly defined in claim 7 wherein said housing, said crossbar and said guide element are all made of synthetic resin material.

* * * * *